(12) United States Patent
Madams

(10) Patent No.: US 12,725,311 B2
(45) Date of Patent: Sep. 1, 2026

(54) RATE-DISTORTION-OPTIMIZATION (RDO) VIA BIT-RATE REDUCTION

(71) Applicant: Sony Interactive Entertainment LLC, San Mateo, CA (US)

(72) Inventor: Thomas Madams, Seattle, WA (US)

(73) Assignee: Sony Interactive Entertainment LLC

( * ) Notice: Subject to any disclaimer, the term of this patent is extended or adjusted under 35 U.S.C. 154(b) by 240 days.

(21) Appl. No.: 18/448,137

(22) Filed: Aug. 10, 2023

(65) Prior Publication Data

US 2025/0054194 A1 Feb. 13, 2025

(51) Int. Cl.
*G06T 9/00* (2006.01)
*G06T 11/10* (2026.01)

(52) U.S. Cl.
CPC ................ *G06T 9/00* (2013.01); *G06T 11/10* (2026.01)

(58) Field of Classification Search
CPC ................................ G06T 9/00; G06T 11/001
See application file for complete search history.

(56) References Cited

U.S. PATENT DOCUMENTS 8,094,164 B1 * 1/2012 Toksvig ................ H04N 19/44 345/582
2011/0157192 A1 6/2011 Gong et al.
2012/0281006 A1 11/2012 Nystad et al.
2012/0307888 A1 * 12/2012 Guo ...................... H04N 19/91 375/240.18
2015/0131919 A1 5/2015 Dewangan et al.
2017/0025098 A1 * 1/2017 Keramidas ................ G06T 9/00
2022/0067977 A1 3/2022 Chang et al.
2022/0217391 A1 * 7/2022 Wang ..................... H04N 19/30
2023/0217026 A1 * 7/2023 Li ........................ H04N 19/176 375/240.02
2024/0314357 A1 * 9/2024 Wang ................... H04N 19/154
2024/0357070 A1 * 10/2024 Dallal .................... H04N 19/46
2024/0378792 A1 * 11/2024 Vaidyanathan ........... G06T 9/00
2025/0014226 A1 * 1/2025 Madams ................ H04N 19/66
2025/0267278 A1 * 8/2025 Lo ........................ H04N 19/119

OTHER PUBLICATIONS

"International Search Report and Written Opinion", dated Nov. 14, 2024, from the counterpart PCT application PCT/US24/35633.
Oodle, "Oodle Texture Compression", Dec. 21, 2023, https://www.radgametools.com/oodletexture.htm.

* cited by examiner

*Primary Examiner* — Juan M Guillermety
(74) *Attorney, Agent, or Firm* — Kilpatrick Townsend & Stockton LLP

(57) ABSTRACT

Techniques are described for storing BC7 texture blocks on-disk with lower precision index data and transcoding back to the GPU-native BC7 format when the data is loaded. The transcode back to standard BC7 is lossless.

20 Claims, 7 Drawing Sheets

Compress Block With Standard BC7 Encoder — 1500

Compress Again Into One Of New Modes — 1502

Compute RDO Criteria — 1504

Encode Each Block Using Mode With Smallest RDO Criteria — 1506

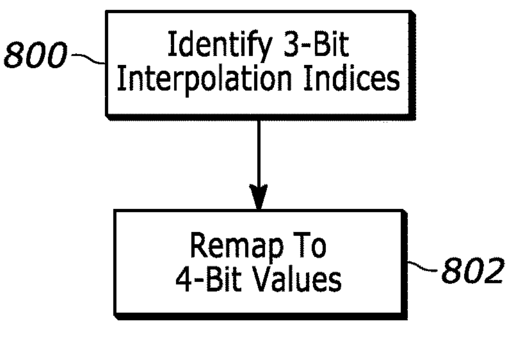
FIG. 8
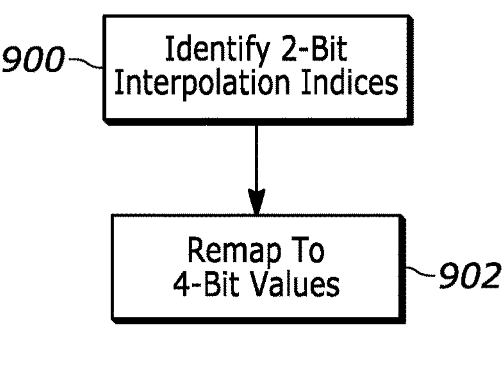
FIG. 9
1000
Identify 1-Bit Interpolation Indices
Remap To 4-Bit Values
1002
FIG. 10

RATE-DISTORTION-OPTIMIZATION (RDO) VIA BIT-RATE REDUCTION

FIELD

The present application relates to technically inventive, non-routine solutions that are necessarily rooted in computer technology and that produce concrete technical improvements, and more specifically to RDO via bit-rate reduction for BC7 texture encoding.

BACKGROUND

In computer simulations such as computer gaming, objects are rendered in part using "texture" data that describes the surfaces of the objects. The more texture data for a given object, the higher resolution the rendering can be. However, for bandwidth purposes it is desirable not to send large texture data structures to a rendering device.

SUMMARY

As understood herein, to conserve memory, texture data is usually compressed into one of a variety of block compression (BCn) modes that are natively sample-able on graphics processing units (GPUs). Present principles recognize that the single-subset BC7 mode 6 can be used to compress the vast majority of 4×4 blocks in an average game texture. Mode 6 has the highest precision endpoint colors and the highest precision interpolation indices (4-bit). However, as further understood by present principles, such high precision to compress a block with low error is often not required.

Accordingly, an apparatus includes at least one processor assembly configured to identify a block compression (BC) 7 mode 6 texture block, and compress the BC7 mode 6 texture block for storage to render a compressed block. The processor assembly is configured to store the compressed block and transcode the compressed block to a BC7 mode 6 or mode 7 block for presentation of a texture.

In an example, the processor assembly is configured to compress the BC7 mode 6 block at least in part by using less than 4-bits of precision for interpolation indices. For example, the processor assembly can be configured to compress the BC7 mode 6 block at least in part by using 3-bits of precision for interpolation indices, or 2-bits of precision for interpolation indices, or 1-bit of precision for interpolation indices. Once the compressed block is transcoded, it can be used to present a texture on at least one video display.

In some examples, in addition to using less than 4-bits of precision for interpolation indices, the processor may be configured to compress the BC7 mode 6 block at least in part by using no more than 5-bits precision for endpoint colors. If desired, all alpha values may be set to 255 for the block. In these examples the processor can be configured to transcode the compressed block to a BC7 mode 7 block for use in presenting a texture on at least one video display. To this end, the processor may be configured to duplicate the 5-bits precision for endpoint colors, one duplicate for each subset in the BC7 mode 7 block.

The transcoding may be accomplished by remapping <4-bit precision interpolation indices to 4-bit values.

Moreover, the processor can be configured to select whether to use 3-bits of precision for interpolation indices, 2-bits of precision for interpolation indices, or 1-bit of precision for interpolation indices at least in part using rate-distortion optimization (RDO).

In another aspect, a device includes at least one computer storage that is not a transitory signal and that in turn includes instructions executable by at least one processor assembly to compress BC7 mode 6 blocks with less than 4-bit per pixel precision index data to render compressed blocks, transcode the compressed blocks to BC7 mode 6 or BC7 mode 7 blocks, and display the BC7 mode 6 or BC7 mode 7 blocks.

In another aspect, a method includes compressing a block compression (BC)7 block of a first mode to use not more than 3-bits of precision for interpolation indices to generate a compressed block. The method includes transcoding the compressed block to a BC7 block of the first mode or a second mode at least in part by mapping the bits of precision to 4-bit values, and rendering, on at least one display, a texture in accordance with the BC7 block of the first mode or a second mode.

In examples of this last aspect, the method may incudes compressing the BC7 block of the first mode to use N bits of precision for interpolation indices to produce a first result, wherein N is an integer less than four (4). This embodiment may also include compressing the BC7 block of the first mode to use N−1 bits of precision for interpolation indices to produce a second result, and executing rate-distortion optimization (RDO) on the first and second results to select the first result or the second result.

The details of the present disclosure, both as to its structure and operation, can be best understood in reference to the accompanying drawings, in which like reference numerals refer to like parts, and in which:

BRIEF DESCRIPTION OF THE DRAWINGS

FIGS. 8-10 respectively illustrate example logic in example flow chart format for transcoding the data structures in FIGS. 5-7 back to native BC7 mode 6 for presentation of the texture;

DETAILED DESCRIPTION

Figure 1:
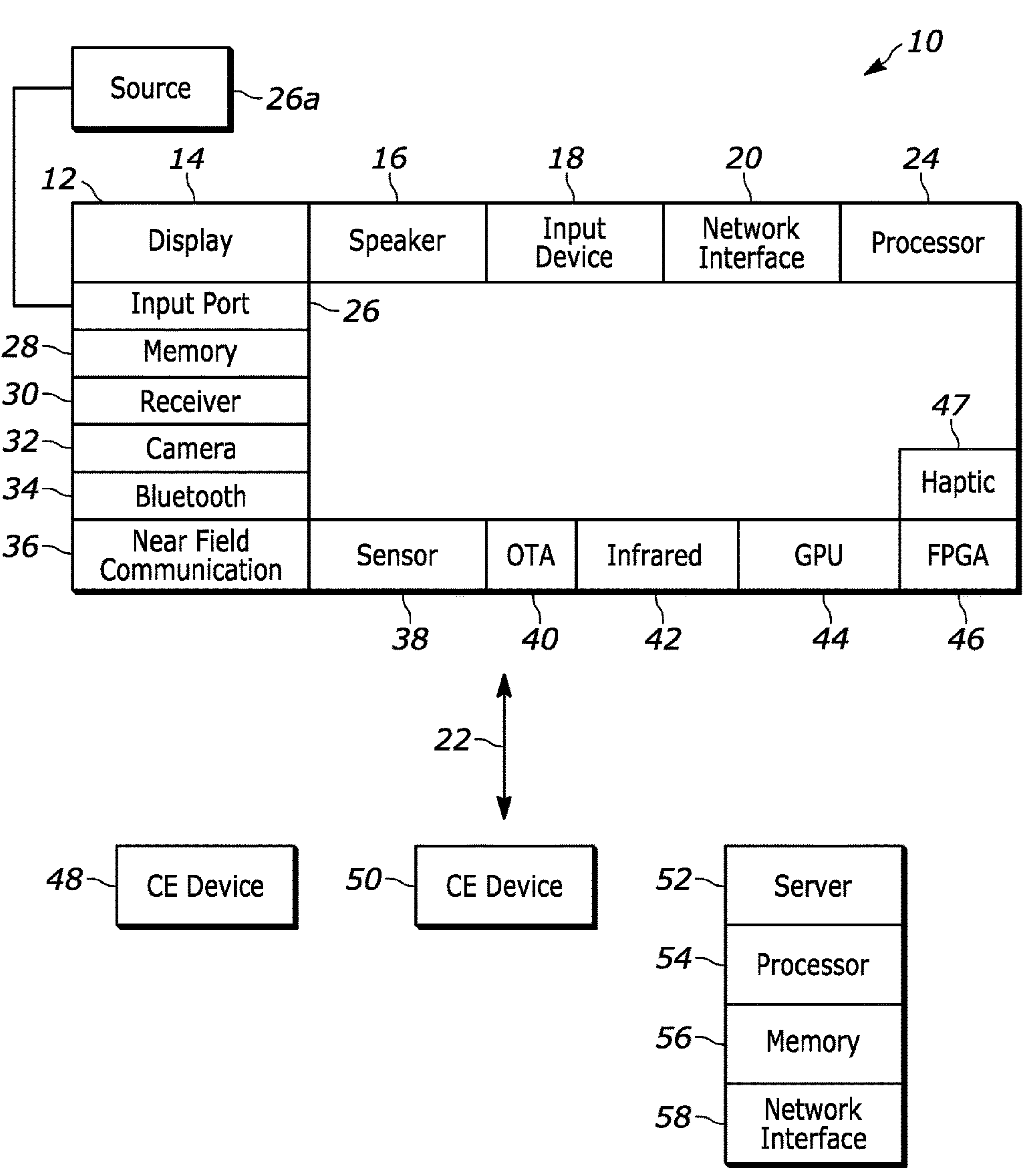
FIG. 1 is a block diagram of an example system including an example in consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components.

The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
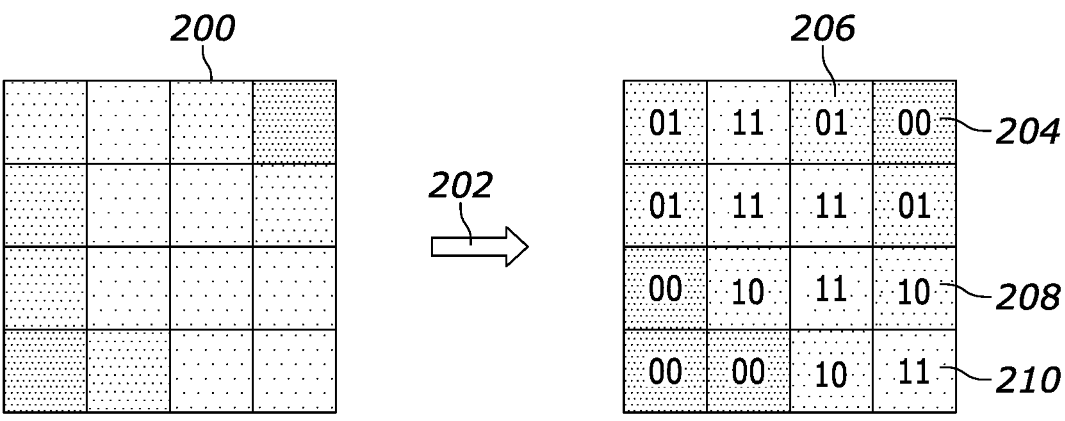
FIG. 2 illustrates a situation in which a BC7 mode 6 block does not need 4-bit per pixel interpolation indices.

Prior to turning to FIG. 2, "textures" are data structures that can be mapped onto images to characterize the surfaces of the rendered objects. The basic data element of a texture data structure is a texture element or texel (combination of texture and pixel). Textures are represented by arrays of texels representing the texture space. The texels are mapped to pixels in an image to be rendered to define the rendered surface of the image.

Various types of compression may be used on textures. One type is block compression, sometimes expressed as BCn compression that is a lossy texture compression which can be decompressed in-place by graphics processing units (GPUs). Block compression does not require the whole image to be decompressed, so the GPU can decompress the data structure while sampling the texture as though it was not compressed at all.

Block compression techniques compress 4×4 blocks of pixels into a single (smaller) data packet. Generally, this involves selecting two or more (depending on the BC compression type) "endpoint" colors with some information per-pixel about how to blend between those two colors at each pixel. The endpoint colors are shared for the entire 4×4 pixel block. For instance, for an image of only red, blue, and purple pixels, the compressor would likely choose one end point to be red, and the other blue. The purple pixels would have values that blend the two together.

The different BC types mostly differ in how many texture channels they have (BC4 for instance is one channel gray-scale, "black and white"). BC6 and BC7 are special because they introduce the concept of modes that decide the interpretation of each block. With BC6/7 different modes allocate their bits differently on a per-block basis which allows the encoder/compressor to make different quality trade-offs in different regions of a texture.

With specific regard to BC7 and consistent with the above, textures are subdivided into fixed size 4×4 blocks, and each block is compressed to a fixed number of bits (e.g., BC7 uses 128 bits per block). Ignoring partitions for now, pixels in a block are represented by a single pair of endpoint colors, shared between all pixels in the block and a 16 per-pixel interpolation index values, which define how much to blend between the two endpoint colors. A pixel's color in the compressed block is calculated by blending between the two endpoint colors by the amount specified by the pixel's interpolation index.

A single pair of endpoint colors can compress a block with low error if all pixels in a block are well-approximated by a blend of those two colors. On the other hand, if a block contains more than two very different colors, it is impossible to define two endpoint colors for which this approximation holds. Accordingly, to address this problem, several modes in BC7 partition a 4×4 block into two or three subsets, and each subset has its own pair of endpoint colors. Multi-subset modes necessarily have lower precision endpoints and interpolation indices because they must fit extra endpoint colors in the same 128 bits as block modes that do not use partitions. A block's partition must be one of sixty four (64) predetermined patterns that are fixed and defined in the BC7 specification.

With greater specificity, BC7 supports eight different compression modes, each of which makes its own respective trade-off between endpoint color precision and interpolation index precision (among other things). The mode used to encode each block is signaled in the first few bits of the encoded data. Generally, modes with higher precision endpoint colors have lower precision interpolation indices, and vice-versa. As mentioned above, the single-subset BC7 mode 6 can be used to compress the vast majority of 4×4 blocks in an average game texture, but it is often the case that the highest precision endpoint colors and the highest precision interpolation indices (4-bit) of this mode are not needed to compress a block with low error.

FIG. 2 provides an illustration of just such a circumstance. In FIG. 2, a block 200 can be compressed as indicated by the arrow 202 using only 2-bit interpolation indices, namely, "00" bits 204, "01" bits 206, "10" bits 208, and "11" bits 210. In FIG. 2, a block 200 can be compressed with minimal additional error as indicated by the arrow 202 using only 2-bit interpolation indices.

Figure 3:
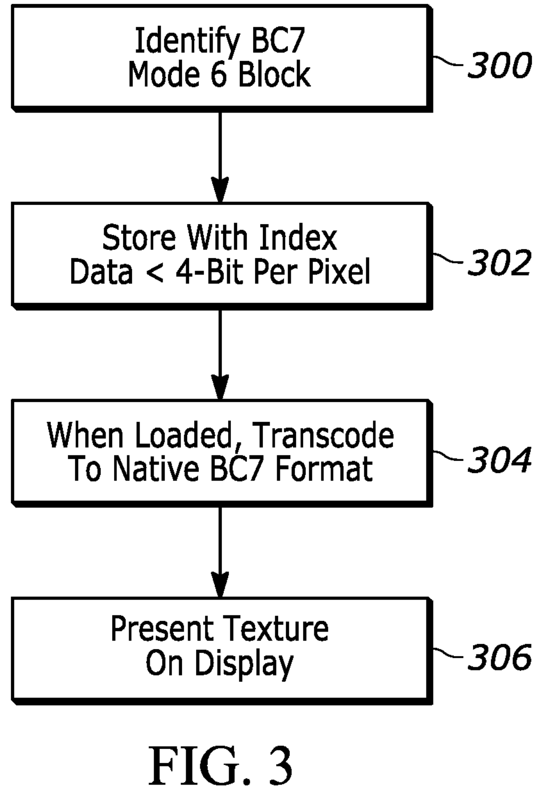
FIG. 3 illustrates example overall logic in example flow chart format.

Accordingly, FIG. 3 illustrates logic underpinned by present principles in which a BC7 block, in the example shown, a BC7 mode 6 block, is identified at state 300 for storage. The block is stored at state 302 with per pixel indices of less than 4-bits, e.g., with 3-bit per pixel indices, or 2-bit per pixel indices, or even 1-bit per pixel indices. This conserves storage space. Storage may be to any appropriate data storage medium such as but not limited to disk. Although some typically very small error may be introduced at compression time, when the block is loaded at state 304 for presentation of the texture, the block is losslessly transcoded back to native BC7 format, such as native BC7 mode 6 format, and presented at state 306 on a video display as part of, e.g., a computer simulation such as a computer game.

Figures 4, 5:
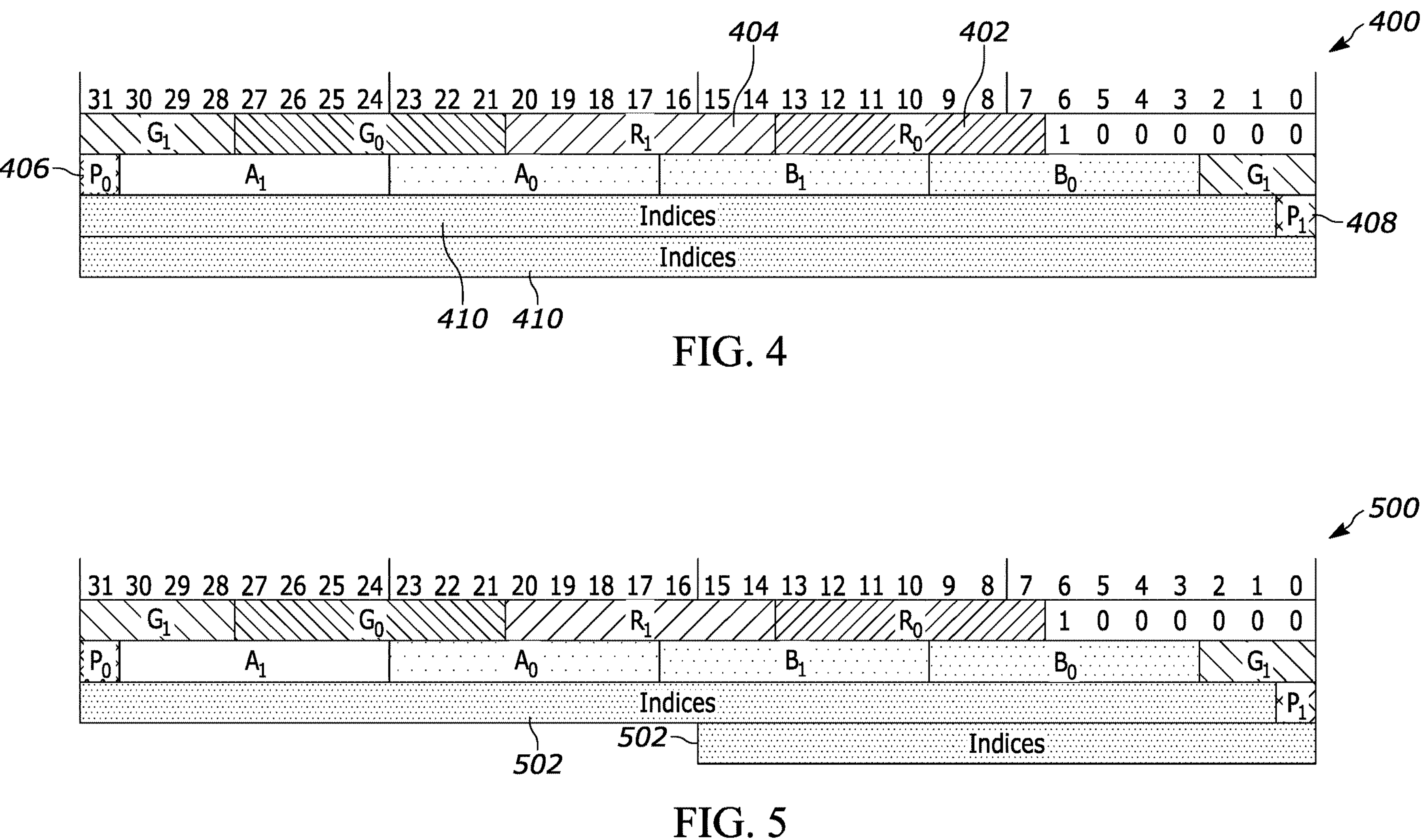
FIG. 4 illustrates a native BC7 mode 6 block layout.
FIGS. 5-7 respectively illustrate storage-only versions of the layout in FIG. 4 with 3-bit, 2-bit- and 1-bit per pixel interpolation indices.

To expand further on implementation details, turn now to FIG. 4 for an understanding of a native BC7 mode 6 block. The bits 1000000 (at 400) at the start of the block signal that this block is compressed using mode 6. The "R", "G", "B", and "A" elements with subscript "0" (collectively indicated at 402) define the upper 7-bits of the red, green, blue and alpha channels for endpoint color 0 whereas the "R", "G", "B", and "A" elements with subscript "1" (collectively indicated at 404) define the upper 7-bits of the red, green, blue and alpha channels for endpoint color 1. The element $P_0$ (indicated at 406) specifies a shared least-significant-bit for all channels of endpoint color 0 while the element $P_1$ (indicated at 408) specifies a shared least-significant-bit for all channels of endpoint color 1.

In other words, $P_0$ defines whether the channels in the endpoint color 0 are either all even, or all odd while $P_1$ defines whether the channels in the endpoint color 1 are either all even, or all odd.

The elements labeled "indices" (indicated at 410) define the sixteen (16) 4-bit per-pixel interpolation indices. Note that there are only 63 bits of index data, not 64 (=4*16) because the endpoint colors must be ordered such that the index value of the first pixel in the block is guaranteed to be less than 8, which means the top bit is always 0 and doesn't need to be stored.

Figures 6, 7:
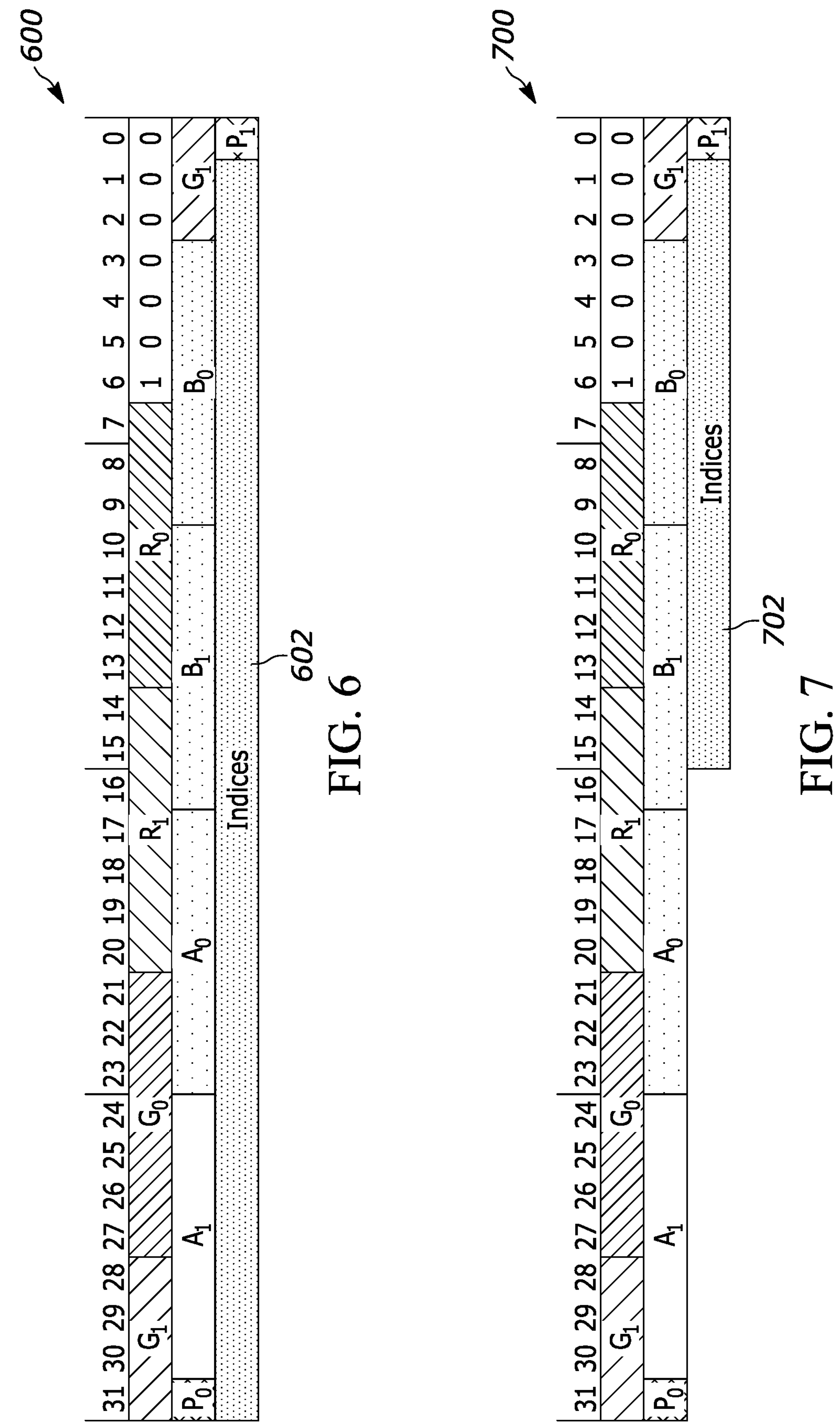

With an understanding of BC7 mode 6 in mind, turn now to FIGS. 5-7, which respectively illustrate three new storage-only block modes that use the same precision for endpoint colors as used in the native BC7 mode 6 format of FIG. 4, but use fewer bits of precision for the interpolation indices.

In FIG. 5, a texture block 500 is identical to block shown in FIG. 4 with the exception that the interpolation indices 502 have only 3-bits per pixel.

In FIG. 6, a texture block 600 is identical to block shown in FIG. 4 with the exception that the interpolation indices 602 have only 2-bits per pixel.

In FIG. 7, a texture block 700 is identical to block shown in FIG. 4 with the exception that the interpolation indices 702 have only 1-bit per pixel.

FIGS. 8-10 respectively illustrate logic for transcoding the storage-only blocks in FIGS. 5-7 to BC7 mode 6 block by copying the endpoint color data, and remapping the interpolation indices to 4-bit values.

At state 800 in FIG. 8, the 3-bit indices 502 of FIG. 5 are identified, and remapped to 4-bit values at state 802. The remapping may be as follows: 3-bit indices: [0, 1, 2, 3, 4, 5, 6, 7] are remapped to 4-bit values [0, 2, 4, 6, 9, 11, 13, 15].

At state 900 in FIG. 9, the 2-bit indices 602 of FIG. 6 are identified, and remapped to 4-bit values at state 902. The remapping may be as follows: 2-bit indices: [0, 1, 2, 3] are remapped to 4-bit values [0, 5, 10, 15].

At state 1000 in FIG. 10, the 1-bit indices 702 of FIG. 7 are identified, and remapped to 4-bit values at state 1002. The remapping may be as follows: 1-bit indices:[0, 1] are remapped to 4-bit values [0, 15].

Note that when using 1-bit or 2-bit indices, most of the compressed data is taken up by the endpoint colors.

Figures 11, 12:
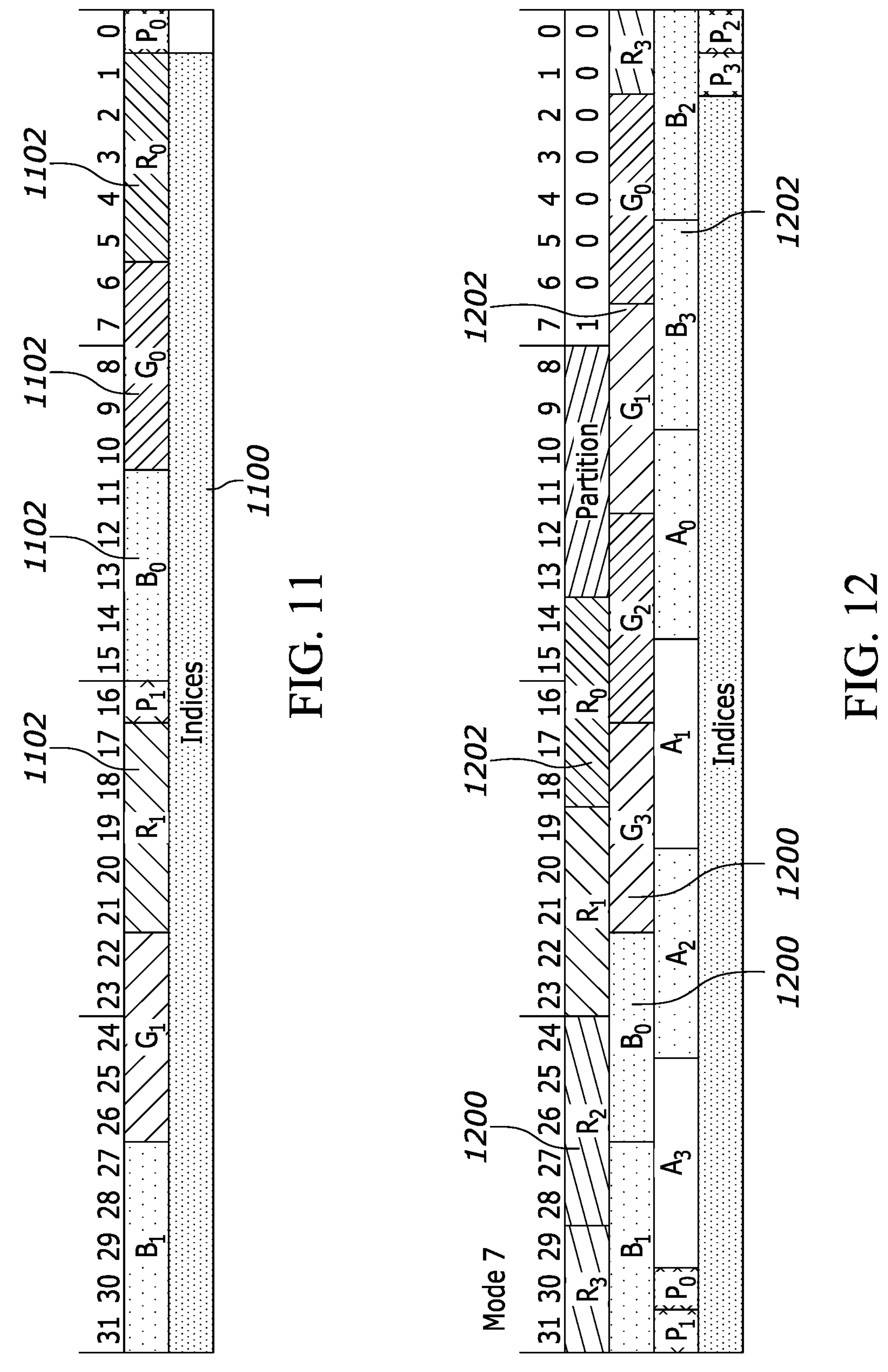
FIG. 11 illustrates yet a fourth compressed storage-only mode for a BC7 mode 6 block.
FIG. 12 illustrates a BC7 mode 7 block to which the mode in FIG. 11 may be transcoded.

FIG. 11 illustrates that further compression may be achieved by introducing a fourth new mode, in which alpha is assumed to be 255 for all pixels (and thus no bits for alpha channels are used), 2-bit interpolation indices 1100 are used (similar to FIG. 6), and the precision for the endpoint colors RGB 1102 is reduced from 7-bits to 5-bits. This mode can then be losslessly transcoded to a BC7 mode 7 block during loading, since mode 7 is the only BC7 block mode that uses 5-bits per channel for endpoint colors (with P-bits) and 2-bit indices. It is to be understood that FIG. 11 may only use 1-bit indices.

FIG. 12 illustrates the bit layout for a BC7 mode 7 block to which the structure of FIG. 11 may be transcoded. Mode 7 blocks have 2-subsets, and because the structure of FIG. 11 doesn't use partitions, the endpoints 1102 in FIG. 11 and P-bits can be duplicated into the endpoints 1200, 1202 for both subsets in the mode 7 block of FIG. 12. Alpha is set to 255 in the mode 7 block and the partition bits in the mode 7 block can be set to anything (0 is sufficient).

Figure 13:
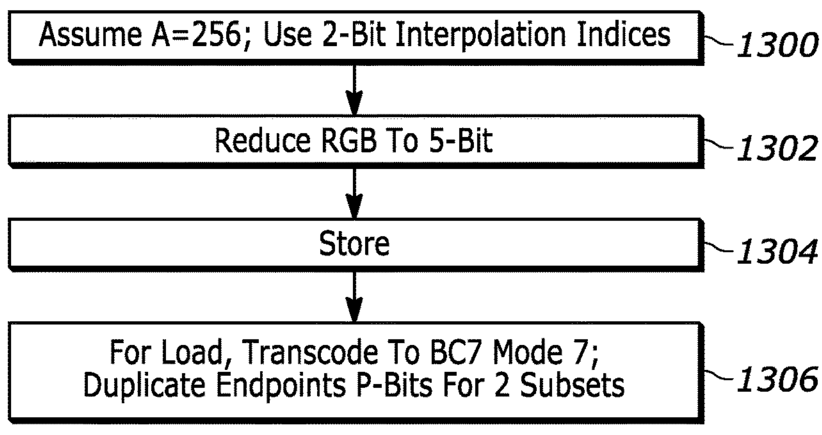
FIG. 13 illustrates example logic in example flow chart format consistent with FIGS. 11 and 12.

FIG. 13 illustrates further. As discussed above, to store a BC7 mode 6 block, at state 1300, 2-bit interpolation indices are generated by compression as discussed above and alpha is set to 255. At state 1302 the RGB endpoints are reduced, for example from 7-bit to 5-bit in a post-processing implementation, and the resulting structure of FIG. 11 stored at state 1304. Upon loading or other event requiring transcoding to a native BC7 format, at state 1306 the RGB endpoints and P-bits are duplicated as described above to support the 2-subset BC7 mode 7 format to arrive at the data structure of FIG. 12 with alpha being set to 255.

As alluded to above, present compression techniques may be implemented as a post-process applied to an already compressed BC7 texture. Alternatively, a BC7 encoder may be modified to operate on the original pixels and directly output the bit-rate reduced blocks (without first compressed to BC7 mode 6). For a post-process implementation RGB may be reduced from 7-bit to 5-bit if the bit-rate reduction is applied to a BC7 mode 6 block, but if original pixels are operated on then the source RGB data to be reduced will be 8-bit. In this latter case original source pixels are directly compressed to the new storage-only modes described herein.

Using the above techniques, an on-disk texture can be made up of a mix of standard BC7 blocks, which are all 128-bit, blocks formatted as shown in FIG. 5, which are 112-bits per block, blocks formatted as shown in FIG. 6, which are 96-bits per block, blocks formatted as shown in FIG. 7, which are 80-bits per block, and blocks formatted as shown in FIG. 11, which are 64-bits per block.

Figure 14:
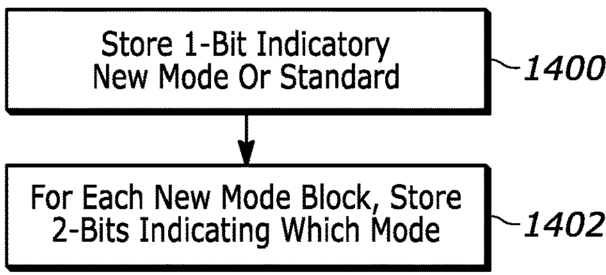
FIG. 14 illustrates example logic in example flow chart format for indicating which new compression mode is used for a stored block.

Some extra data may be stored in the on-disk texture file to describe which blocks use the new modes. FIG. 14 illustrates further, specifically, a technique that is amenable to subsequent lossless compression (e.g., zip). At state 1400, one bit per block is stored indicating whether the stored block is in one of the formats of FIG. 5, 6, 7, or 11 or is an untransformed (standard or native) BC7 block. A value of 0 may indicate the block is a standard BC7 block whereas a value of 1 may indicate the block is one of the new modes.

Then, at state 1402 for each block in the texture that uses a new mode, 2 bits are stored that indicate which mode the block is, e.g., 00 can indicate the mode of FIG. 5 (uses 3-bit indices, transcodes to mode 6), 01 can indicate the mode of FIG. 6 (uses 2-bit indices, transcodes to mode 6), 10 can indicate the mode of FIG. 7 (uses 1-bit indices, transcodes to mode 6), and 11 can indicate the mode of FIG. 11 (uses reduced color precision endpoints and 2-bit indices, transcodes to mode 7).

Figure 15:
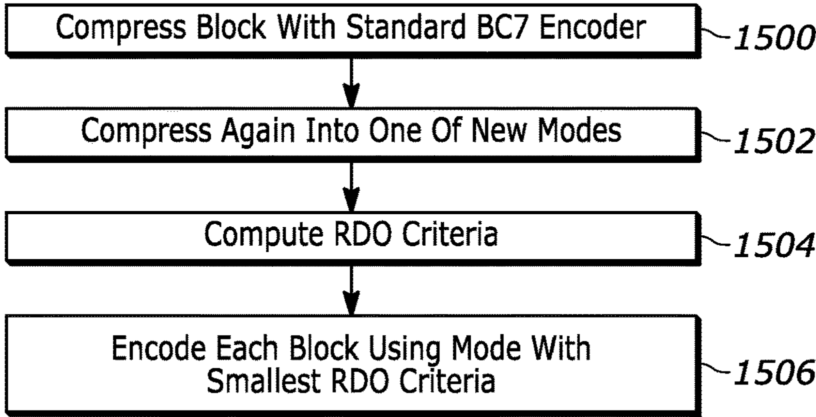
FIG. 15 illustrates example logic in example flow chart format for using RDO to select which of FIG. 5, 6, 7, or 11 to use to compress a BC7 mode 6 block for storage.

When compressing the source texture, the mode may be selected using rate-distortion optimization (RDO). FIG. 15 illustrates further for the post-process embodiment, it being understood that FIG. 15 may be modified to compress directly from source pixels as mentioned above.

Commencing at state 1500, each block of pixels is first compressed using a standard BC7 encoder. Moving to state 1502, the block is then further compressed with an encoder that uses the modes of FIGS. 5-7 and 11.

Proceeding to state 1504, for each of these compressed blocks, the following rate-distortion criteria is computed:

expected_compressed_size*rdo_lambda+compression_error

Where expected_compressed_size is an estimate of the compressed size of the block after subsequent lossless compression (e.g., zip), rdo_lambda is a user-specified parameter that controls how much compression error is acceptable: increasing RDO lambda will result in smaller data but the compressed textures will have higher error, and compression_error is a measure of how much error has been introduced by the compression process, e.g.: root-mean-squared error, structural similarity (SSIM).

State 1506 indicates that the mode (FIG. 5, FIG. 6, FIG. 7, or FIG. 8) with the smallest RDO criteria is selected to encode the block under test for storage.

It is to be understood that present techniques are compatible with other technologies that apply a lossless transform to BC7 block data to make it more compressible by a subsequent lossless data compressor like zip, generally by shuffling the bits within a block so that they better align to byte boundaries.

While particular techniques are herein shown and described in detail, it is to be understood that the subject matter which is encompassed by the present application is limited only by the claims.

What is claimed is:

1. An apparatus comprising:

at least one processor assembly configured to:

identify a block compression (BC) 7 mode 6 texture block;

determine a number of bits of precision based on a rate-distortion technique;

compress the BC7 mode 6 texture block by reducing a number of bits of precision per interpolation index below that used in a standard BC7 mode 6 format, wherein the reduced number of bits of precision is determined based on a storage size and a reconstruction error metric;

store the compressed block; and when the BC7 mode 6 texture block is needed for rendering, transcode the compressed block by mapping reduced-precision interpolation indices of the compressed block to values compatible with a BC7 mode 6 or mode 7 format.

2. The apparatus of claim 1, wherein the at least one processor assembly is configured to:

compress the BC7 mode 6 block at least in part by using less than 4-bits of precision for interpolation indices.

3. The apparatus of claim 2, wherein the processor is configured to:

transcode the compressed block to a BC7 mode 6 block; and use the BC7 mode 6 block to present a texture on at least one video display.

4. The apparatus of claim 2, wherein the at least one processor assembly is configured to:

compress the BC7 mode 6 block at least in part by using no more than 5-bits precision for endpoint colors.

5. The apparatus of claim 4, wherein the at least one processor assembly is configured to:

transcode the compressed block to a BC7 mode 7 block; and use the BC7 mode 7 block to present a texture on at least one video display.

6. The apparatus of claim 5, wherein the at least one processor assembly is configured to:

duplicate the 5-bits precision for endpoint colors, one duplicate for each subset in the BC7 mode 7 block.

7. The apparatus of claim 1, wherein the at least one processor assembly is configured to:

compress the BC7 mode 6 block at least in part by using 3-bits of precision for interpolation indices.

8. The apparatus of claim 1, wherein the at least one processor assembly is configured to:

compress the BC7 mode 6 block at least in part by using 2-bits of precision for interpolation indices.

9. The apparatus of claim 1, wherein the at least one processor assembly is configured to:

compress the BC7 mode 6 block at least in part by using 1-bit of precision for interpolation indices.

10. The apparatus of claim 1, wherein the at least one processor assembly is configured to:

transcode the compressed block to a BC7 mode 6 block at least in part by remapping <4-bit precision interpolation indices to 4-bit values.

11. The apparatus of claim 1, wherein the at least one processor assembly is configured to:

select whether to use 3-bits of precision for interpolation indices, 2-bits of precision for interpolation indices, or 1-bit of precision for interpolation indices at least in part using rate-distortion optimization (RDO).

12. The apparatus of claim 1, wherein the reduced number of bits of precision is determined based on a cost function that includes storage size and reconstruction error.

13. A device comprising:

at least one computer storage that is not a transitory signal and that comprises instructions executable by at least one processor assembly to:

compress block compression (BC) 7 mode 6 blocks by reducing a number of bits of precision per interpolation index below that used in a standard BC7 mode 6 format, wherein the reduced number of bits of precision is determined based on a storage size and a reconstruction error metric; and when the BC7 mode 6 blocks are needed for rendering, transcode the compressed blocks by mapping reduced-precision interpolation indices of the compressed block to values compatible with a BC7 mode 6 or BC7 mode 7 format.

14. The device of claim 13, wherein the instructions are executable to transcode the compressed blocks at least in part by mapping the less than 4-bit per pixel precision index data to 4-bit values.

15. The device of claim 13, wherein the instructions are executable to compress the BC7 mode 6 block at least in part by using 3-bits of precision for interpolation indices.

16. The device of claim 13, wherein the instructions are executable to compress the BC7 mode 6 block at least in part by using 2-bits of precision for interpolation indices.

17. The device of claim 13, wherein the instructions are executable to compress the BC7 mode 6 block at least in part by using 1-bit of precision for interpolation indices.

18. The device of claim 13, wherein the instructions are executable to:

compress the BC7 mode 6 block at least in part by using no more than 5-bits precision for endpoint colors;

transcode the compressed block to a BC7 mode 7 block at least in part by duplicating the 5-bits precision for endpoint colors, one duplicate for each subset in the BC7 mode 7 block; and use the BC7 mode 7 block to present a texture on at least one video display.

19. A method, comprising:

compressing a block compression (BC) 7 block of a first mode by reducing a number of bits of precision per interpolation index below that used in a standard BC7 mode 6 format, wherein the reduced number of bits of precision is determined based on a storage size and a reconstruction error metric;

when the compressed block is needed for rendering, transcoding the compressed block by mapping reduced-precision interpolation indices of the compressed block to values compatible with a BC7 block of the first mode or a second mode; and rendering, on at least one display, a texture in accordance with the BC7 block of the first mode or the second mode.

20. The method of claim 19, comprising:

compressing the BC7 block of the first mode to use N bits of precision for interpolation indices to produce a first result, wherein N is an integer less than four (4);

compressing the BC7 block of the first mode to use N−1 bits of precision for interpolation indices to produce a second result; and executing rate-distortion optimization (RDO) on the first and second results to select the first result or the second result.

* * * * *